United States Patent
Ports, III et al.

(10) Patent No.: US 11,528,267 B2
(45) Date of Patent: Dec. 13, 2022

(54) SYSTEM FOR AUTOMATED IMAGE AUTHENTICATION AND EXTERNAL DATABASE VERIFICATION

(71) Applicant: Bank of America Corporation, Charlotte, NC (US)

(72) Inventors: Preston Wesley Ports, III, Charlotte, NC (US); Sangeeta Varma Martinez, Aliso Viejo, CA (US); Dipika Jain, Charlotte, NC (US); Michael Toth, Charlotte, NC (US); Melissa K. Van Leuven, Avondale, AZ (US); Holly Martinez, Wilmington, DE (US); Dawn M. Friscia, Medfield, MA (US); Erin Marie McCullen, Charlotte, NC (US); Deborah D. Jackson, Topsham, ME (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 296 days.

(21) Appl. No.: 16/706,333

(22) Filed: Dec. 6, 2019

(65) Prior Publication Data
US 2021/0176238 A1   Jun. 10, 2021

(51) Int. Cl.
*H04L 9/40* (2022.01)
*G06F 16/535* (2019.01)
*H04W 12/77* (2021.01)

(52) U.S. Cl.
CPC ........ *H04L 63/0861* (2013.01); *G06F 16/535* (2019.01); *H04L 63/08* (2013.01); *H04W 12/77* (2021.01)

(58) Field of Classification Search
None
See application file for complete search history.

(56) References Cited

U.S. PATENT DOCUMENTS

| 7,194,761 B1 * | 3/2007 | Champagne | H04L 63/08 713/168 |
| 7,240,363 B1 * | 7/2007 | Ellingson | G06Q 20/3821 705/72 |

(Continued)

FOREIGN PATENT DOCUMENTS

CN    202217289 U   *  5/2012

OTHER PUBLICATIONS

Nitin et al ("On a Software Architecture of JUIT-Image Based Authentication System," Advances in Electrical and Electronics Engineering,"IAENG Special Edition of the World Congress on Engineering and Computer Science," pp. 35-46 (Year: 2008).*

(Continued)

*Primary Examiner* — Luu T Pham
*Assistant Examiner* — James J Wilcox
(74) *Attorney, Agent, or Firm* — Moore & Van Allen PLLC; Seongun M. Hong (57) ABSTRACT

A system provides for automated image authentication and external database verification. In particular, the system may perform automatic authentication of an image by extracting data and/or metadata from the image for subsequent analysis. For instance, the extracted data and/or metadata may be compared with historical data to drive authorization processes (e.g., past instances of unauthorized activity). In some embodiments, the system may further use external databases which may be hosted by a trusted third party to perform additional authentication steps and/or verification. In this way, the system may provide a reliable and efficient way to perform authentications.

8 Claims, 2 Drawing Sheets

(56) References Cited

U.S. PATENT DOCUMENTS

| | | | |
|---|---|---|---|
| 7,296,149 B2* | 11/2007 | Hiltgen | G06Q 20/3674 713/172 |
| 7,346,779 B2* | 3/2008 | Leeper | H04L 63/0861 380/231 |
| 7,729,532 B2* | 6/2010 | Tedesco | H04L 63/08 382/156 |
| 7,735,125 B1 | 6/2010 | Alvarez et al. | |
| 7,804,982 B2 | 9/2010 | Howard et al. | |
| 7,891,558 B2 | 2/2011 | Erikson | |
| 8,185,743 B1* | 5/2012 | Goott | G06Q 20/401 713/156 |
| 8,233,751 B2 | 7/2012 | Patel et al. | |
| 8,255,573 B2* | 8/2012 | Kawamoto | H04L 63/101 709/218 |
| 8,281,145 B2* | 10/2012 | Rasti | H04L 63/0884 713/168 |
| 8,370,639 B2* | 2/2013 | Azar | G06K 9/6255 713/186 |
| 8,528,073 B2* | 9/2013 | Tawara | H04L 63/083 726/18 |
| 8,538,095 B2 | 9/2013 | Fedele et al. | |
| 8,606,669 B2 | 12/2013 | Fergusson | |
| 8,621,209 B1* | 12/2013 | Johansson | H04L 63/08 713/170 |
| 8,678,273 B2* | 3/2014 | McNeal | G07F 7/122 382/116 |
| 8,750,570 B2 | 6/2014 | Kerschner et al. | |
| 8,788,419 B2* | 7/2014 | Samuels | H04L 63/20 705/42 |
| 8,996,868 B2* | 3/2015 | Lee | H04W 12/033 713/168 |
| 9,054,860 B1* | 6/2015 | Rothschild | H04L 63/123 |
| 9,219,723 B1* | 12/2015 | Potash | H04L 63/10 |
| 9,235,276 B1 | 1/2016 | Maloney et al. | |
| 9,264,461 B1* | 2/2016 | Van de Wetering | H04L 63/083 |
| 9,280,696 B1 | 3/2016 | Fraser | |
| 9,331,994 B2* | 5/2016 | Grigg | G06F 16/24578 |
| 9,450,956 B1 | 9/2016 | Giobbi | |
| 9,473,674 B2* | 10/2016 | Mondo | H04L 67/306 |
| 9,485,237 B1* | 11/2016 | Johansson | H04L 9/3271 |
| 9,485,655 B1* | 11/2016 | Pirrotta | G06F 21/88 |
| 9,544,308 B2* | 1/2017 | Minter | G06V 40/70 |
| 9,705,894 B2* | 7/2017 | Su | H04L 63/12 |
| 9,722,996 B1* | 8/2017 | Kolman | H04L 63/083 |
| 9,742,764 B1* | 8/2017 | Ziraknejad | G06F 21/45 |
| 9,811,671 B1 | 11/2017 | Durst et al. | |
| 9,824,358 B2 | 11/2017 | Ericson et al. | |
| 10,075,843 B1* | 9/2018 | Schuler | H04W 4/02 |
| 10,114,935 B2* | 10/2018 | Das | H04L 63/0861 |
| 10,200,360 B2* | 2/2019 | Draluk | G06F 3/017 |
| 10,200,364 B1* | 2/2019 | Ketharaju | H04L 63/0853 |
| 10,282,535 B2* | 5/2019 | Tunnell | G06Q 30/0248 |
| 10,284,556 B1* | 5/2019 | Sokolov | H04L 63/1425 |
| 10,373,409 B2 | 8/2019 | White et al. | |
| 10,375,119 B2* | 8/2019 | Aronowitz | H04L 63/205 |
| 10,404,465 B2* | 9/2019 | Takahashi | H04L 9/32 |
| 10,419,418 B2* | 9/2019 | Grajek | H04L 63/0807 |
| 10,432,621 B2* | 10/2019 | Vo | G06F 3/04817 |
| 10,452,897 B1* | 10/2019 | Benkreira | G06V 40/168 |
| 10,453,159 B2 | 10/2019 | Kapczynski | |
| 10,496,801 B2* | 12/2019 | Hamlin | H04L 63/08 |
| 10,552,592 B2* | 2/2020 | Hwang | G06V 40/70 |
| 10,574,650 B2* | 2/2020 | Wallace | G06V 40/70 |
| 10,587,423 B2* | 3/2020 | Nagaratnam | H04L 63/08 |
| 10,735,497 B2* | 8/2020 | Yin | G06F 21/45 |
| 10,750,009 B1* | 8/2020 | Cox | H04W 12/06 |
| 10,785,217 B2* | 9/2020 | Arunkumar | H04N 21/4415 |
| 10,791,461 B1* | 9/2020 | Gailloux | H04W 12/06 |
| 10,868,812 B2* | 12/2020 | Siddiqui | H04L 9/3271 |
| 10,977,595 B2* | 4/2021 | Anderson | H04L 63/08 |
| 11,004,072 B2* | 5/2021 | Georgiadis | H04L 63/08 |
| 11,019,063 B2* | 5/2021 | Legault | H04L 63/0861 |
| 11,042,854 B2* | 6/2021 | Mehta | H04L 63/0823 |
| 11,151,564 B2* | 10/2021 | Hutchinson | G06F 7/00 |
| 11,303,631 B1* | 4/2022 | Alexanian | G06F 21/45 |
| 2002/0052193 A1* | 5/2002 | Chetty | H04L 63/0853 455/410 |
| 2003/0152252 A1* | 8/2003 | Kondo | G06F 21/32 382/117 |
| 2004/0158724 A1* | 8/2004 | Carr | B42D 25/333 713/186 |
| 2004/0243832 A1* | 12/2004 | Wilf | G06Q 20/40 726/4 |
| 2005/0092835 A1* | 5/2005 | Chung | H01Q 1/38 235/386 |
| 2005/0175201 A1* | 8/2005 | Herman | G06F 21/31 381/60 |
| 2005/0198510 A1* | 9/2005 | Robert | H04L 63/0428 713/175 |
| 2006/0168647 A1* | 7/2006 | Chiloyan | H04W 12/082 726/4 |
| 2008/0141353 A1* | 6/2008 | Brown | G10L 13/00 704/260 |
| 2008/0222706 A1* | 9/2008 | Renaud | H04L 63/1408 726/4 |
| 2011/0016534 A1* | 1/2011 | Jakobsson | H04L 67/535 726/28 |
| 2011/0235627 A1* | 9/2011 | Wang | H04L 63/0428 370/338 |
| 2011/0255788 A1 | 10/2011 | Duggan et al. | |
| 2011/0289322 A1* | 11/2011 | Rasti | H04L 63/0421 713/182 |
| 2011/0302646 A1* | 12/2011 | Ronda | H04L 9/3268 726/9 |
| 2012/0011575 A1* | 1/2012 | Cheswick | H04L 63/08 726/5 |
| 2012/0311684 A1* | 12/2012 | Paulsen | H04L 63/0815 726/6 |
| 2013/0036480 A1* | 2/2013 | Anderson | G06F 21/34 726/30 |
| 2013/0159021 A1 | 6/2013 | Felsher | |
| 2013/0211907 A1* | 8/2013 | Morgenstern | G06Q 30/0245 705/14.44 |
| 2014/0096177 A1* | 4/2014 | Smith | H04L 63/08 726/1 |
| 2014/0125574 A1* | 5/2014 | Scavezze | G06F 21/34 345/156 |
| 2014/0136012 A1* | 5/2014 | Tam | G06F 17/00 701/1 |
| 2014/0189829 A1* | 7/2014 | McLachlan | G06Q 20/4014 726/6 |
| 2014/0282893 A1* | 9/2014 | Sheller | H04L 63/08 726/4 |
| 2014/0289822 A1* | 9/2014 | Wilson | H04L 9/0819 726/5 |
| 2014/0331293 A1* | 11/2014 | Toole | H04L 63/08 726/5 |
| 2015/0047000 A1* | 2/2015 | Spencer, III | H04L 63/18 726/7 |
| 2015/0058016 A1* | 2/2015 | Goldstein | G06F 16/636 704/246 |
| 2015/0095252 A1* | 4/2015 | Mattsson | G06F 16/258 705/325 |
| 2015/0095986 A1* | 4/2015 | Karpey | H04L 63/08 726/4 |
| 2015/0096056 A1* | 4/2015 | Mattsson | H04L 63/0807 726/29 |
| 2015/0128241 A1* | 5/2015 | Jakobsson | G06F 21/316 726/7 |
| 2015/0281231 A1* | 10/2015 | Ganesan | H04L 63/18 455/411 |
| 2015/0371024 A1* | 12/2015 | Kim | H04L 63/08 726/18 |
| 2016/0006730 A1* | 1/2016 | Chari | G06F 21/32 726/7 |
| 2016/0036798 A1* | 2/2016 | Mulhearn | H04W 12/065 726/7 |
| 2016/0065570 A1* | 3/2016 | Spencer, III | G06Q 20/40145 726/7 |

(56) References Cited

U.S. PATENT DOCUMENTS

| | | | |
|---|---|---|---|
| 2016/0085954 A1* | 3/2016 | Tunnell | H04L 63/0853 726/7 |
| 2016/0142405 A1* | 5/2016 | Deffeyes | G06V 40/70 726/7 |
| 2016/0149906 A1* | 5/2016 | Yamada | G06K 9/6215 382/115 |
| 2016/0171209 A1* | 6/2016 | Perez | G06F 21/35 726/6 |
| 2016/0191511 A1* | 6/2016 | Tijerina | A61B 5/318 726/7 |
| 2016/0292737 A1 | 10/2016 | Barnes, Jr. | |
| 2016/0301533 A1* | 10/2016 | Mishra | H04L 63/083 |
| 2016/0323249 A1* | 11/2016 | Duncker | G06F 16/2379 |
| 2017/0012979 A1* | 1/2017 | Matsushita | H04L 63/102 |
| 2017/0093850 A1* | 3/2017 | Kukreja | G06F 21/41 |
| 2017/0223017 A1* | 8/2017 | Kohli | H04L 63/0853 |
| 2017/0236034 A1 | 8/2017 | Dolev | |
| 2017/0344724 A1* | 11/2017 | Nockley | G06Q 10/10 |
| 2018/0014189 A1* | 1/2018 | Ellison | H04W 12/06 |
| 2018/0063128 A1* | 3/2018 | Korus | G06F 21/40 |
| 2018/0089403 A1* | 3/2018 | Watson | G06F 21/45 |
| 2018/0167387 A1* | 6/2018 | Bhatt | H04L 63/0853 |
| 2018/0248685 A1* | 8/2018 | O'Brien | H04L 9/3236 |
| 2018/0253539 A1* | 9/2018 | Minter | G06F 21/64 |
| 2018/0253738 A1 | 9/2018 | Benson | |
| 2018/0268477 A1 | 9/2018 | Adari | |
| 2018/0309792 A1* | 10/2018 | Obaidi | G06F 21/32 |
| 2019/0012448 A1* | 1/2019 | Lesso | H04L 63/0861 |
| 2019/0012755 A1* | 1/2019 | Williams | H04W 4/40 |
| 2019/0020476 A1* | 1/2019 | Kats | H04L 63/0853 |
| 2019/0058728 A1* | 2/2019 | Datta | H04L 67/1097 |
| 2019/0092283 A1* | 3/2019 | Kristinsson | H04W 12/065 |
| 2019/0124072 A1* | 4/2019 | Georges | H04L 63/0892 |
| 2019/0158655 A1* | 5/2019 | DeLuca | H04L 63/102 |
| 2019/0188509 A1* | 6/2019 | He | G06T 7/0002 |
| 2019/0207949 A1* | 7/2019 | Parker | H04L 67/535 |
| 2019/0228213 A1* | 7/2019 | MacDonald | G06F 21/316 |
| 2019/0251571 A1 | 8/2019 | O'Reilly et al. | |
| 2019/0253444 A1* | 8/2019 | Yu | H04L 63/1425 |
| 2019/0258838 A1* | 8/2019 | Sweeney | G06K 19/06037 |
| 2019/0268321 A1* | 8/2019 | Kim | G06F 21/31 |
| 2019/0306709 A1* | 10/2019 | Kim | H04L 63/105 |
| 2019/0325125 A1* | 10/2019 | Pantfoerder | H04W 8/005 |
| 2019/0342096 A1* | 11/2019 | Starosielsky | H04L 63/0428 |
| 2019/0347632 A1 | 11/2019 | Lucas et al. | |
| 2019/0349351 A1* | 11/2019 | Verma | G06F 21/552 |
| 2019/0362828 A1* | 11/2019 | Laxer | H04L 63/083 |
| 2019/0384932 A1* | 12/2019 | Pratt | H04W 12/61 |
| 2020/0042685 A1* | 2/2020 | Tussy | G06F 21/32 |
| 2020/0099684 A1* | 3/2020 | Nagaraja | G06F 21/45 |
| 2020/0134165 A1* | 4/2020 | Boodaei | H04L 63/083 |
| 2020/0220876 A1* | 7/2020 | Suzuki | G06Q 20/321 |
| 2020/0285776 A1* | 9/2020 | Schwartz | H04L 63/0853 |
| 2020/0334581 A1* | 10/2020 | Skaling | H04W 12/77 |
| 2021/0021615 A1* | 1/2021 | Go | H04L 12/40 |
| 2021/0105264 A1* | 4/2021 | Patel | H04L 9/3228 |
| 2021/0224799 A1* | 7/2021 | Ongpin | H04L 63/083 |
| 2021/0303670 A1* | 9/2021 | Owaki | G06F 9/542 |

OTHER PUBLICATIONS

Gunasignhe et al ("PrivBioMTAuth: Privacy Preserving Biometrics-Based and User Centric Protocol for User Authentication from Mobile Phones," IEEE Transactions on Information Forensics and Security, vol. 13. No. 4, Apr. 2018, pp. 1042-1057 (Year: 2018).*

Korus et al. "A Novel Approach to Adaptive Image Authentication," 2011 18th IEEE International Conference on Image Processing, 2011, IEEE, pp. 2765-2768.*

* cited by examiner

SYSTEM FOR AUTOMATED IMAGE AUTHENTICATION AND EXTERNAL DATABASE VERIFICATION

FIELD OF THE INVENTION

The present disclosure embraces a system for automated image authentication and external database verification.

BACKGROUND

There is a need for a more effective way to perform electronic authentication.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for automated image authentication and external database verification. In particular, the system may perform automatic authentication of an image by extracting data and/or metadata from the image for subsequent analysis. For instance, the extracted data and/or metadata may be compared with historical data to drive authorization processes (e.g., past instances of unauthorized activity). In some embodiments, the system may further use external databases which may be hosted by a trusted third party to perform additional authentication steps and/or verification. In this way, the system may provide a reliable and efficient way to perform authentications.

Accordingly, embodiments of the present disclosure provide a system for executing automated image authentication and external database verification. The system may comprise a memory device with computer-readable program code stored thereon; a communication device; and a processing device operatively coupled to the memory device and the communication device. The processing device may be configured to execute the computer-readable program code to receive an authentication request from a user; based on the authentication request, receive authentication data from the user; access a third party database, the third party database comprising third party data associated with the user; compare the authentication data from the user with the third party data associated with the user; and based on comparing the authentication data from the user with the third party data associated with the user, validate the authentication request.

In some embodiments, receiving authentication data from the user comprises capturing one or more images of an identification object received from the user; and extracting the authentication data from the one or more images.

In some embodiments, the authentication data comprises one or more security elements associated with the identification object.

In some embodiments, the authentication data comprises a past image of the user.

In some embodiments, the computer-readable program code further causes the processing device to capture a current image of the user; and compare the current image of the user with the past image of the user.

In some embodiments, validating the authentication request comprises generating an authentication score associated with the authentication request; detecting that the authentication score is above a defined threshold; and granting the authentication request.

In some embodiments, validating the authentication request comprises detecting that the authentication data received from the user matches data associated with a known unauthorized user; reject the authentication request; and automatically prevent the user from submitting additional authentication requests.

Embodiments of the present disclosure also provide a computer program product for executing automated image authentication and external database verification, the computer program product comprising at least one non-transitory computer readable medium having computer-readable program code portions embodied therein. The computer-readable program code portions may comprise executable code portions for receiving an authentication request from a user; based on the authentication request, receiving authentication data from the user; accessing a third party database, the third party database comprising third party data associated with the user; comparing the authentication data from the user with the third party data associated with the user; and based on comparing the authentication data from the user with the third party data associated with the user, validating the authentication request.

In some embodiments, receiving authentication data from the user comprises capturing one or more images of an identification object received from the user; and extracting the authentication data from the one or more images.

In some embodiments, the authentication data comprises one or more security elements associated with the identification object.

In some embodiments, the authentication data comprises a past image of the user.

In some embodiments, the computer-readable code portions further comprise executable portions for capturing a current image of the user; and comparing the current image of the user with the past image of the user.

In some embodiments, validating the authentication request comprises generating an authentication score associated with the authentication request; detecting that the authentication score is above a defined threshold; and granting the authentication request.

Embodiments of the present disclosure also provide a computer-implemented method for executing automated image authentication and external database verification, wherein the method comprises receiving an authentication request from a user; based on the authentication request, receiving authentication data from the user; accessing a third party database, the third party database comprising third party data associated with the user; comparing the authentication data from the user with the third party data associated with the user; and based on comparing the authentication data from the user with the third party data associated with the user, validating the authentication request.

In some embodiments, receiving authentication data from the user comprises capturing one or more images of an identification object received from the user; and extracting the authentication data from the one or more images.

In some embodiments, the authentication data comprises one or more security elements associated with the identification object.

In some embodiments, the authentication data comprises a past image of the user.

In some embodiments, the method further comprises capturing a current image of the user; and comparing the current image of the user with the past image of the user.

In some embodiments, validating the authentication request comprises generating an authentication score associated with the authentication request; detecting that the authentication score is above a defined threshold; and granting the authentication request.

In some embodiments, validating the authentication request comprises detecting that the authentication data received from the user matches data associated with a known unauthorized user; reject the authentication request; and automatically prevent the user from submitting additional authentication requests.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS
OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity, or a third party who is not related to the entity.

Accordingly, the term "user device" or "mobile device" may refer to mobile phones, personal computing devices, tablet computers, wearable devices, and/or any stationary or portable electronic device capable of receiving and/or storing data therein.

"Resource" as used herein may refer to an object under the ownership of a user which is stored or maintained by the entity on the user's behalf. The resource may be intangible or tangible objects such as data files, documents, funds, and the like. Typically, an account associated with the user contains records of the resources owned by the user. Accordingly, account data may be stored in an account database within the entity's systems.

An entity may use various types of methods to authenticate users and authorize certain activities based on authenticating the user. In this regard, the system may, upon receiving an authentication request from a user, analyze certain images associated with the user to extract data and/or metadata from the image. The extracted data and/or metadata may be compared with previously stored data associated with the user and/or real-time data associated with the user. In some embodiments, the extracted data and/or metadata may be compared with user data which may be hosted on a third party server or platform for further authentication purposes. Based on verifying the user data as described above, the system may automatically authenticate the user and authorize certain actions based on the authentication.

An exemplary use case of the system is provided below for illustrative purposes. A user (e.g., a customer of an entity) may submit a request to open an account and/or to access an existing account associated with the user (e.g., on the entity's premises). The system may then attempt to authenticate the user based on information provided by the user. For instance, in some embodiments, the user may present a tangible form of identification (e.g., a document such as a driver's license or passport) for authentication purposes. Once the license is received, the system may scan both the front and the back portions of the license and extract data and/or metadata from the scanned image of the license. In particular, the system may identify certain fields of identifying information (e.g., user's name, address, date of birth, expiration date of the license, issuing department or entity, or the like) as well as certain security features or characteristics (e.g., a watermark, holographic layer, layout or placement of information fields, and the like).

Once the relevant data and/or metadata has been extracted from the image of the license, the system may compare the extracted data/metadata with information from external databases for further verification. Continuing the above example, the system may access an external database associated with an issuer of the license (e.g., an agency such as a department of motor vehicles), where the external database may contain identifying information as described above and/or information regarding the layout of the license, including the security features as described above. Accordingly, the system verify the information extracted from the image of the license with the information provided by the issuer of the license for authentication purposes. If the information matches, then the system may consider the user to be authenticated and may subsequently authorize the requested action (e.g., opening an account, taking actions with respect to the account, or the like). If the system detects any discrepancies in the information, the system may display a notification on a computing system of an agent or employee of the entity, where the notification may highlight the discrepancies in the information (e.g., by color-coding/marking the image, by displaying an error message such as "address mismatch," or the like). The system may subsequently reject the authorization request and/or request that the user take one or more additional authentication steps.

In some embodiments, the system may further capture a real-time photo of the user upon receiving the authentication request. The photo of the user may then be stored in a user database to be subsequently recalled for authentication requests received in the future. Upon being recalled, the photo may be compared to the user and/or the image on the license or passport for further verification of identity. In some embodiments, the photo of the user may further be compared with historical data associated with the user (e.g., past photos of the user) and/or information within a particular database (e.g., database containing photos of known unauthorized users).

The system as described herein confers a number of technological advantages over conventional authentication systems. By performing the verification steps with external databases and/or historical user data, the system may increase the effectiveness of the authentication process and reduce the incidence of unauthorized access within the network environment.

Figure 1:
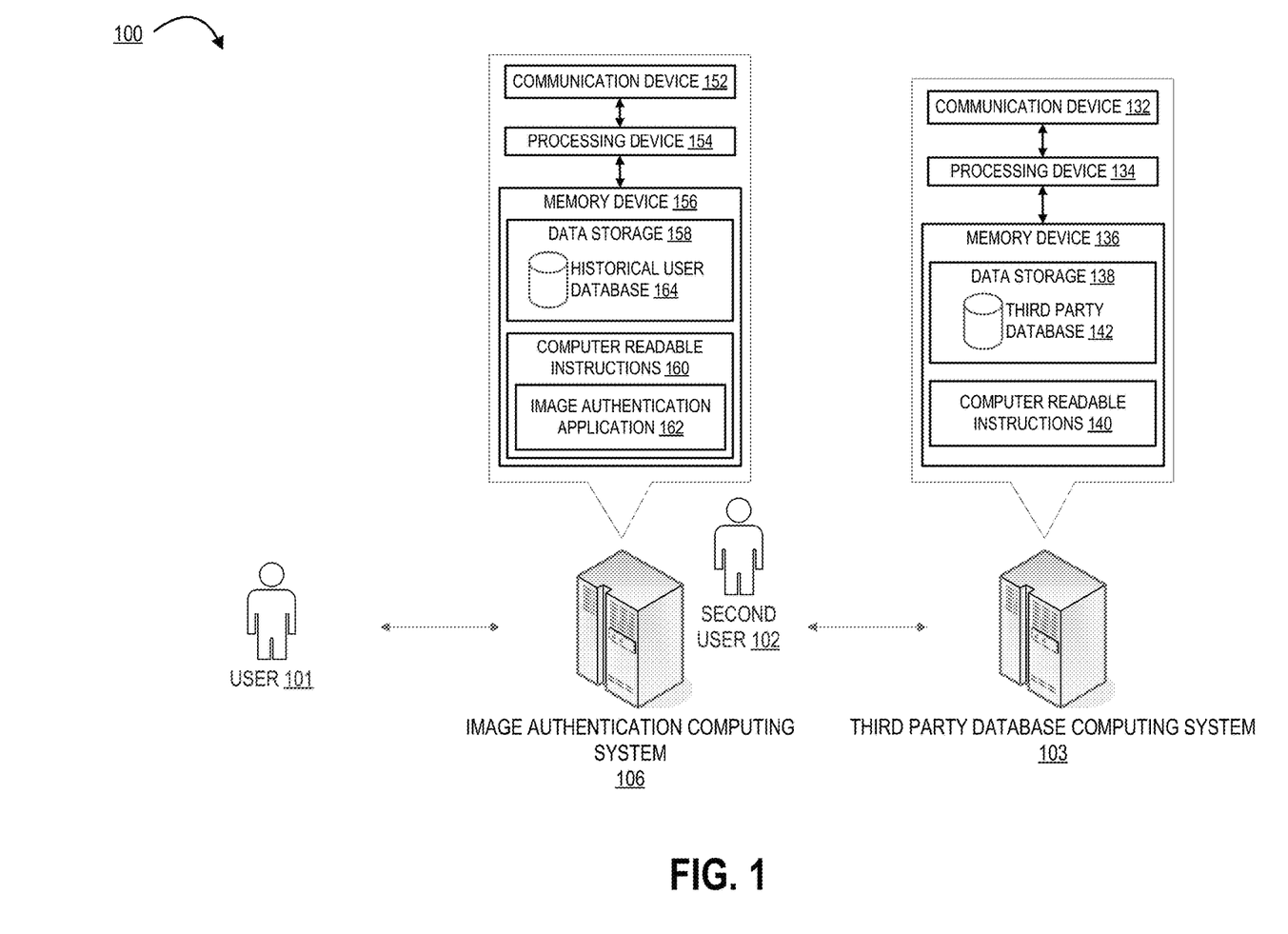
FIG. 1 illustrates an operating environment for the image authentication system, in accordance with one embodiment of the present disclosure.

Turning now to the figures, FIG. 1 illustrates an operating environment 100 for the image authentication system, in accordance with one embodiment of the present disclosure. In particular, FIG. 1 illustrates an image authentication computing system 106 that is operatively coupled, via a network, to a third party database computing system 103. In such a configuration, the image authentication computing system 106 may, in some embodiments, transmit information to and/or receive information from the third party database computing system 103. It should be understood that FIG. 1 illustrates only an exemplary embodiment of the operating environment 100, and it will be appreciated that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though the third party database computing system 103 is depicted as a single unit, the operating environment 100 may comprise multiple different third party database computing systems 103 hosted by multiple different third party entities.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the image authentication computing system 106 may be a computing system that performs the image authentication functions as described herein. Accordingly, the image authentication computing system 106 may comprise a communication device 152, a processing device 154, and a memory device 156. The image authentication computing system 106 may be a device such as a networked server, desktop computer, terminal, or any other type of computing system as described herein. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the third party database computing system 103. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of an image authentication application 162 which executes the image authentication and cross-verification functions as described herein. In this regard, the image authentication application 162 may perform its functions at least partially based on input provided from a user 101 (e.g., a customer of the entity). The input from the user 101 may contain, for instance, authentication requests to authorize performing certain functions with respect to the user and/or an account of the user, authentication data (including identifying documents) and/or images of the authentication data (e.g., images of the identifying documents and/or features of the user), and the like. Accordingly, in some embodiments, the image authentication computing system 106 may be operated by a second user 102 (e.g., an agent of the entity) who may request the authentication data from the user 101. Accordingly, the image authentication computing system 106 may further comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

In other embodiments, the user 101 may directly transmit the authentication data to the image authentication computing system 106 through one or more input methods (e.g., a scanner, camera, keypad, keyboard, microphone, or other types of input devices) located on the image authentication computing system 106 and/or an intermediate device such as a smartphone, IoT device, laptop, desktop, or other personal computing device of the user 101.

In some embodiments, the memory device 156 includes data storage 158 for storing data related to the system environment. In this regard, the data storage 158 may comprise a historical user database 164, which may include various types of data and/or metadata regarding past interactions with the user 101 and/or other users. For instance, the historical user database 164 may include images taken of the user, records of past authentication attempts, user account data, and the like. In some embodiments, the historical user database 164 may further contain information regarding users which are known to be unauthorized to access the entity's system.

As further illustrated in FIG. 1, the operating environment 100 may further comprise a third party database computing system 103 in operative communication with the image authentication computing system 106. The third party database computing system 103 may be a computing system that is operated by a third party entity with an association or interaction with the user 101. For instance, the third party entity may be an agency or organization that has issued an identifying document to the user 101 (e.g., a driver's license or government ID). Accordingly, the third party database computing system 103 may be a device such as a desktop computer, laptop, IoT device, smartphone, tablet, single-board computer, or the like.

The third party database computing system 103 may further comprise a processing device 134 operatively coupled to a communication device 132 and a memory device 136 having data storage 138 and computer readable instructions 140 stored thereon. The data storage 138 may comprise a third party database 142 which may comprise data associated with the user 101. For instance, if the third party entity is an issuing agency of a form of identification for the user 101 (e.g., a department of motor vehicles), the third party database 142 may comprise information about the user 101 such as a name, address, driver's license number, issue/expiration date, photographs of the user 101, and the like. The third party database 142 may further comprise information related to the form of identification itself, such as the layout/location of security features (e.g., watermarks, holograms, or the like), layout of data fields, and other identifying features. In this regard, the information within the third party database 142 may be used by the image authentication computing system 106 for cross-verification with authentication data (e.g., an image of a driver's license of the user 101).

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

Figure 2:
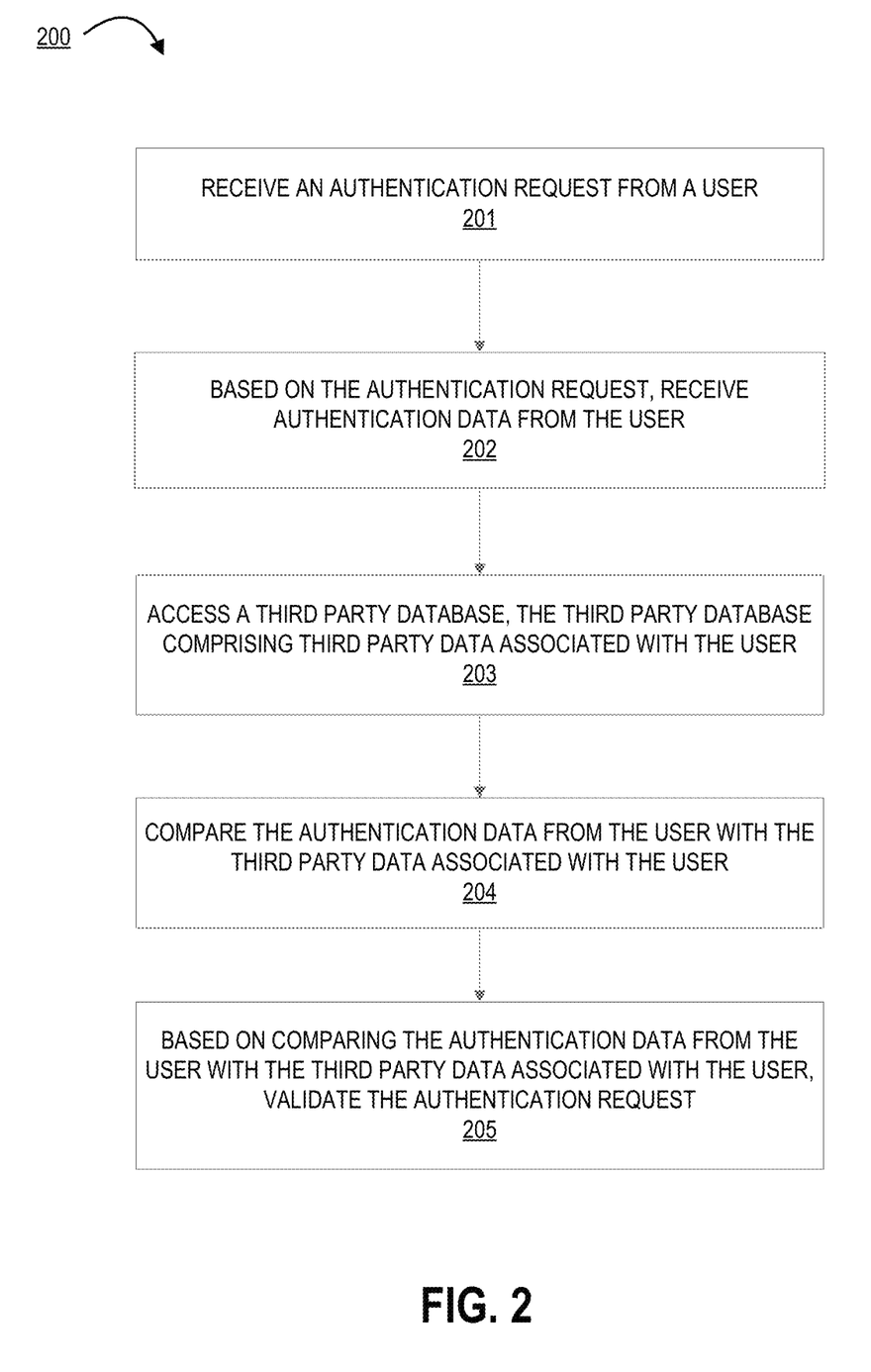
FIG. 2 illustrates a process flow for the image authentication system, in accordance with one embodiment of the present disclosure.

FIG. 2 illustrates a process flow 200 for the image authentication system, in accordance with some embodiments of the present disclosure. The process begins at block 201, where the system receives an authentication request from a user. In some embodiments, the user may be a customer of an entity who may submit an authentication request to take certain actions with respect to an entity's services. For instance, the user may wish to open an account with an entity such as a financial institution or to access an existing account associated with the user (e.g., to perform transactions, view account information, or the like). In some embodiments, the user may submit the authentication request while located in the entity's premises (e.g., while interfacing with an agent of the entity). In other embodiments, the authentication request may be sent by the user during an interaction with the user's personal computing device and the computing systems of the entity.

The process continues to block 202, where the system, based on the authentication request, receives authentication data from the user. The authentication data may include various types of information about and/or associated with the identity of the user. For instance, the authentication data may include contact information (e.g., name, address, e-mail address, or the like), passcodes, photographs of the user, or the like. In this regard, receiving the authentication data may include receiving an identification object (e.g., an identifying document such as a passport, driver's license, or other agency-issued form of identification) from the user and capturing images of all relevant portions of the identifying document (e.g., both the front and back of a driver's license). The system may then extract authentication data from the images of the identifying document. For instance, the system may extract the photo of the user (e.g., a past image of the user) from a driver's license, as well as entry fields/data elements corresponding to information associated with the user (e.g., name, address, license number, issue/expiration date, issuing agency, and the like). The extracted authentication data may then be subsequently analyzed to authenticate the user.

In some embodiments, the authentication data may comprise a photo of the user captured by the system upon receiving the authentication request (e.g., a current image of the user). The photo of the user may be captured, for instance, by a camera within a computing system at the entity's premises. In other embodiments, the photo of the user may be self-captured by the user via a user device such as a camera-equipped mobile device (e.g., a smartphone). The captured photo of the user may then be compared to the extracted photograph from the identifying document and/or previously stored photographs of the user. In this way, the system may further increase the level of confidence of successfully verifying the identity of the user.

The process continues to block 203, where the system accesses a third party database, the third party database comprising third party data associated with the user. The third party database may be owned and/or hosted by an entity possessing certain information about the user, such as an issuing agency of the user's identifying document. Accordingly, the third party data associated with the user may contain at least a portion of the information present within the data elements on the identifying document, as described above. The third party database may further comprise historical data associated with the user. For instance, the third party data may include not only a current address, but also past addresses of the user. In some embodiments, the third party database may further comprise information related to the identifying document itself. For example, such information may include the layout of data elements and/or security elements within the identifying document (e.g., on authentic documents, a watermark appears in the upper left corner of the front of the license).

The process continues to block 204, where the system compares the authentication data from the user with the third party data associated with the user. Continuing the above example, the information extracted from the user's identifying document (e.g., a driver's license) may be compared with the third party data associated with the user (e.g., information stored by the issuing department of the driver's license). For instance, the name, address, license number, expiration date, and other types of information as extracted from the license may be compared to the name, address, license number expiration date, and the like as stored within the third party database. Based on the comparison, the system may generate an authentication score indicating the degree of confidence to which the system has identified the user, where higher scores indicate a greater number of matches between the extracted authentication data and the third party data, and conversely, lower scores may indicate a lower number of matches. In some embodiments, different types of information may have different effects on the authentication score. For instance, mismatches in the address (e.g., the license has an outdated address listed on the front) may cause the authentication score to drop by relatively low amounts, whereas mismatches in the license number or name may cause the authentication score to drop by relatively higher amounts. In some embodiments, the authentication data from the user may be sent to a third party processor for the authentication analysis as described above.

The process concludes at block 205, where the system, based on comparing the authentication data from the user with the third party data associated with the user, validate the authentication request. In some embodiments, validating the authentication request may include verifying whether the authentication score has crossed a defined threshold (e.g., 80 out of 100). If the authentication score is above the threshold, the authentication request may be granted, and the user may be authorized to take certain actions with respect to the entity (e.g., open an account, access account information, and the like). If the authentication score is below the threshold, the system may reject the authentication request and further prompt the user to provide additional identifying information. Alternatively, if the authentication data received from the user matches that of a known unauthorized user, the system may reject the authentication request and automatically prevent the user from taking any further actions within the system (e.g., submitting additional authentication requests).

In some embodiments, the system may continuously store information about the user and/or the user's interactions within the system in a historical database. For example, the system may store photos captured of the user, images of the provided identifying documents, authentication scores, authentication request outcomes, and the like. Based on the information within the historical database, the system may adjust its authentication processes to further prevent unauthorized authentication attempts.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for executing automated image authentication and external database verification, the system comprising:
   a memory device with computer-readable program code stored thereon;
   a communication device; and
   a processing device operatively coupled to the memory device and the communication device, wherein the processing device is configured to execute the computer-readable program code to:
   receive an authentication request from a user;
   based on the authentication request, receive authentication data from the user, wherein the authentication data comprises a document comprising an image of the user;
   capture an image of the document;
   extract image authentication data from the image of the document, wherein the image authentication data comprises the image of the user, a license number associated with the user, and an address associated with the user;
   capture a real-time image of the user;
   access a third party database, the third party database comprising third party data associated with the user, wherein the third party data comprises historical image data associated with the user and historical information associated with the user, wherein the historical information comprises a historical license number associated with the user and a historical address associated with the user;
   compare the real-time image of the user with image authentication data from the user and the historical image data of the third party data associated with the user;
   generate an authentication score for the authentication request based at least in part on comparing the real-time image of the user with the image authentication data from the user and the historical image data of the third party data associated with the user;
   compare the license number associated with the user with the historical license number associated with the user;
   based on comparing the license number associated with the user with the historical license number associated with the user, decrease the authentication score by a first amount;
   compare the address associated with the user with the historical address associated with the user;
   based on comparing the address associated with the user with the historical address associated with the user, decrease the authentication score by a second amount, wherein the first amount is greater than the second amount; and
   based on the authentication score, validate the authentication request, wherein validating the authentication request comprises:
   detecting that the authentication data received from the user matches data associated with a known unauthorized user;
   reject the authentication request; and
   automatically prevent the user from submitting additional authentication requests.

2. The system according to claim 1, wherein the authentication data comprises one or more security elements associated with the document.

3. The system according to claim 1, wherein validating the authentication request comprises:
generating an authentication score associated with the authentication request;
detecting that the authentication score is above a defined threshold; and
granting the authentication request.

4. A computer program product for executing automated image authentication and external database verification, the computer program product comprising at least one non-transitory computer readable medium having computer-readable program code portions embodied therein, the computer-readable program code portions comprising executable code portions for:
receiving an authentication request from a user;
based on the authentication request, receiving authentication data from the user, wherein the authentication data comprises a document comprising an image of the user;
capturing an image of the document;
extracting image authentication data from the image of the document, wherein the image authentication data comprises the image of the user, a license number associated with the user, and an address associated with the user;
capturing a real-time image of the user;
accessing a third party database, the third party database comprising third party data associated with the user, wherein the third party data comprises historical image data associated with the user and historical information associated with the user, wherein the historical information comprises a historical license number associated with the user and a historical address associated with the user;
comparing the real-time image of the user with image authentication data from the user and the historical image data of the third party data associated with the user;
generating an authentication score for the authentication request based at least in part on comparing the real-time image of the user with the image authentication data from the user and the historical image data of the third party data associated with the user;
comparing the license number associated with the user with the historical license number associated with the user;
based on comparing the license number associated with the user with the historical license number associated with the user, decreasing the authentication score by a first amount;
comparing the address associated with the user with the historical address associated with the user;
based on comparing the address associated with the user with the historical address associated with the user, decreasing the authentication score by a second amount, wherein the first amount is greater than the second amount; and
based on the authentication score, validating the authentication request, wherein validating the authentication request comprises:
detecting that the authentication data received from the user matches data associated with a known unauthorized user;
reject the authentication request; and
automatically prevent the user from submitting additional authentication requests.

5. The computer program product according to claim 4, wherein the authentication data comprises one or more security elements associated with the document.

6. A computer-implemented method for executing automated image authentication and external database verification, wherein the method comprises:
receiving an authentication request from a user;
based on the authentication request, receiving authentication data from the user, wherein the authentication data comprises a document comprising an image of the user;
capturing an image of the document;
extracting image authentication data from the image of the document, wherein the image authentication data comprises the image of the user, a license number associated with the user, and an address associated with the user;
capturing a real-time image of the user;
accessing a third party database, the third party database comprising third party data associated with the user, wherein the third party data comprises historical image data associated with the user and historical information associated with the user, wherein the historical information comprises a historical license number associated with the user and a historical address associated with the user;
comparing the real-time image of the user with image authentication data from the user and the historical image data of the third party data associated with the user;
generating an authentication score for the authentication request based at least in part on comparing the real-time image of the user with the image authentication data from the user and the historical image data of the third party data associated with the user;
comparing the license number associated with the user with the historical license number associated with the user;
based on comparing the license number associated with the user with the historical license number associated with the user, decreasing the authentication score by a first amount;
comparing the address associated with the user with the historical address associated with the user;
based on comparing the address associated with the user with the historical address associated with the user, decreasing the authentication score by a second amount, wherein the first amount is greater than the second amount; and
based on the authentication score, validating the authentication request, wherein validating the authentication request comprises:
detecting that the authentication data received from the user matches data associated with a known unauthorized user;
reject the authentication request; and
automatically prevent the user from submitting additional authentication requests.

7. The computer-implemented method according to claim 6, wherein the authentication data comprises one or more security elements associated with the document.

8. The computer-implemented method according to claim 6, wherein validating the authentication request comprises:
generating an authentication score associated with the authentication request;

detecting that the authentication score is above a defined threshold; and
granting the authentication request.

\* \* \* \* \*